W. A. HEXT.
DUST ARRESTER.
APPLICATION FILED MAR. 19, 1920.
1,402,294.
Patented Jan. 3, 1922.
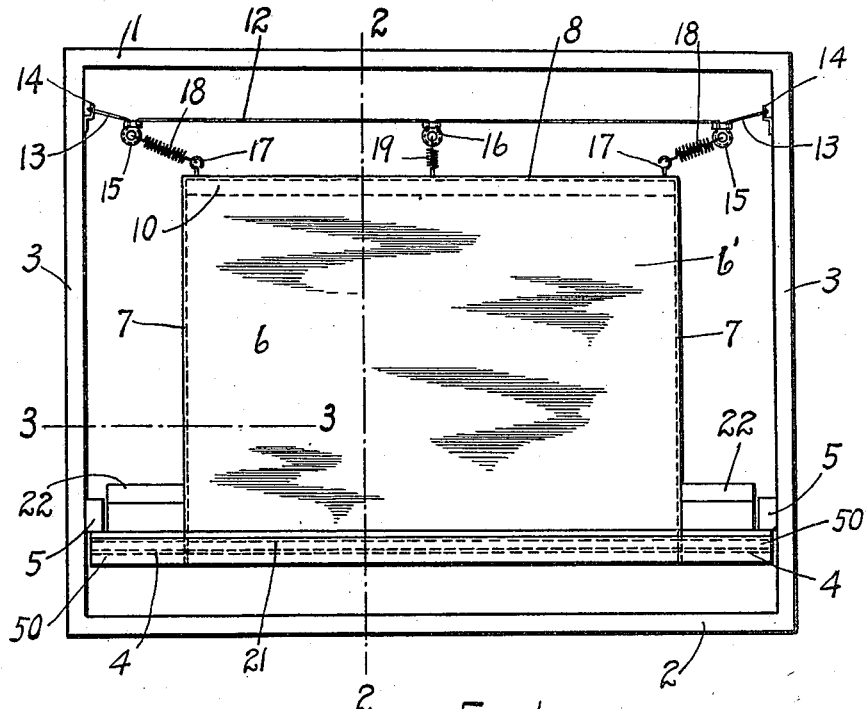
Fig. 1.
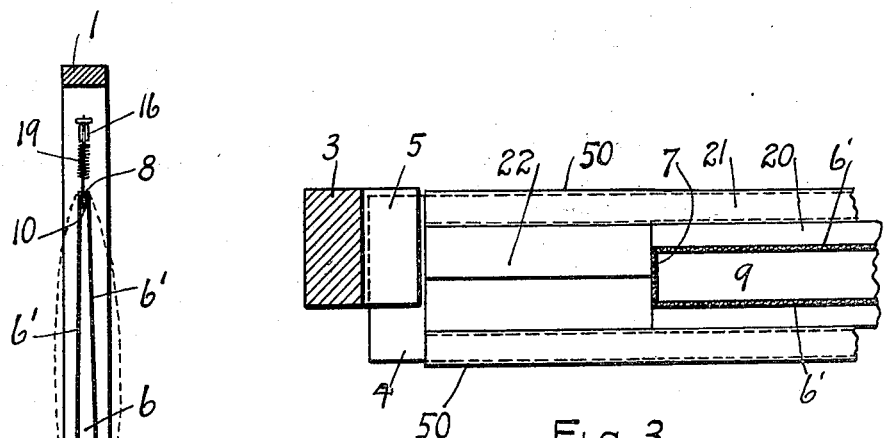
Fig. 2. Fig. 3.
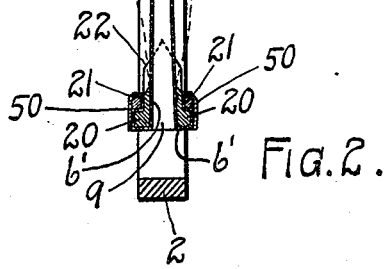
INVENTOR.
William A. Hext
by John W. Streher
ATTORNEY.

UNITED STATES PATENT OFFICE.

WILLIAM A. HEXT, OF CINCINNATI, OHIO.

DUST ARRESTER.

1,402,294. Specification of Letters Patent. Patented Jan. 3, 1922.

Application filed March 19, 1920. Serial No. 367,117.

*To all whom it may concern:*

Be it known that I, WILLIAM A. HEXT, a citizen of the United States, residing at the city of Cincinnati, in the county of Hamilton and State of Ohio, have invented certain new and useful Improvements in Dust Arresters, of which the following is a specification.

Dust arresters are used in factories, fertilizing works, foundries, cereal manufacturing works and the like, where dust accumulates and ladens the air, to arrest or reclaim the dust and also filter or purify the air. This dust is valuable for many purposes, or can be reused.

My invention relates more particularly to the screen upon which the dust is first collected, and from which it is precipitated into the collecting pan or box. The dust gathers onto these screens, a muliplicity of which are used in connection with each dust arrester.

Many of the screens now used are very expensive; dust accumulates between them; they must be specially agitated to drop or precipitate the dust; the accumulated dust between them, often retards their agitation; they are hard to clean and many are very heavy and cumbersome.

By the use of my screen these objections are obviated.

My new screen is free from any heavy frame; it is of an inverted V shape to quickly precipitate the dust; it can be expanded by the pressure of the accumulated dust driven by the air, and when the force of the air is cut off, the screen collapses and the dust is precipitated without agitation, and the screen instantly passes back to normal position.

The screen is held in a normal position by spring tension and this tension allows the screen to assume a flexible, yielding and resilient status, in order that its work may be better carried out.

My screen can be shifted, so that when dust accumulates between the series of screens, by shifting the screens it can readily be precipitated.

My screen is very simple in construction, cheap of manufacture, is highly efficient, and it possesses a marked degree of utility.

Its advantages and features will readily become apparent from a perusal of the following specification and claims.

In the accompanying drawing, forming a part of this specification:

Fig. 1, is a view of one of the screens in elevation,

Fig. 2, is a section on line 2—2 of Fig. 1, and

Fig. 3 is a section on the line 3—3 of Fig. 1.

In order to illustrate one specific form of my invention, I have shown in the drawing a frame composed of top and bottom pieces 1 and 2 respectively, side pieces 3, 3, and partly up from the bottom piece I provide a cross-piece 4. Any form of frame may however, be provided. Just above the cross piece 4, I attach to the side pieces 3, 3, on the inside thereof, blocks as 5, 5; the cross piece 4 is loose and not fastened to the sides and abuts or presses up against the blocks 5, 5, and can slide to and fro or forward and backward, the blocks 5 guiding and holding the same in support.

In carrying out my invention, I provide the screen proper and designate it 6, and it is formed of two sides, $6^1$, $6^1$, which are connected at the ends 7 and at the top 8 and open at the bottom 9; forming an inverted V shaped receptacle, ponch; bag provided at the top edge, on the inside with a supporting rod or strip 10, over which passes the top of the screen 6.

This screen 6 is suspended or hung up as shown by top wire 12 and inclined wires 13, 13, the wires supported at each side in the brackets 14; these wires 13, 13, provided with eyes 15 and the wire 12 with eyes 16.

At each end of the screen 6 I provide eyes 17 which are fastened in supporting piece or strip 10 and coiled springs 18 reach from the edges 17 to eyes 15, said springs being at an inclined angle as shown; from eye 16 on wire 12, at approximately the middle thereof, I connect a coiled spring 19, which extends from said eyes down to the strip 10 and is connected thereto.

At the bottom the screen sides $6^1$, $6^1$, pass down and over the retaining strips 20, 20, on each side and are held in position by cleats 21, then they pass on over the cleat, extending down to the bottom edge of the cross strip 4, as shown by numeral 50. This apron 50 extends along the whole length of strips 4, where the screen is present and also on each side thereof.

The purpose of these aprons is this; when the adjacent screens are placed contiguous, these aprons or laps on each screen will fit closely together and prevent dust from falling down between the screens at this point.

In this manner I place the screen 6 in a distended position, the tension of the wires and springs keeping it in such position, and always pulling upward and laterally, the retaining or guide blocks 5, 5, retaining the screen in normal position and keeping it from moving upwardly.

On each side of the screen 6, between it and the guide blocks 5, 5, I place two beveled faced blocks 22, so shaped to allow the dust to fall off, so as not to clog the parts, that the screen can be slid readily and easily.

The screen may be distended and held suspended in any form and manner, other than herein specifically set forth and shown.

The screen 6 may be made of any material, as drilling, duck, canvas, or any other flexible or textile fabric, or fine meshed wire or perforated light metal; some material being needed which if filled with interstices, so that the dust will be held suspended, reclaimed and arrested, but still allow the passage of the air therethrough.

Dust arresters, that is, the complete apparatus, are of various forms and sizes and operate upon various principles, but my screen can be used in connection therewith. The screens are generally hung up or disposed in series, generally lying in the same plane and contiguous to each other. If the dust arrester is operated by air pressure or force and the air and dust are blown into the machine, or taken in by suction, the air and dust pass up into the mouths 9 of the screens, and up into the same, the air is forced through the interstices in the screen body and passes out at any desired point in the apparatus and the dust accumulates on the inner surface of the screen 6, its sides often bulging out as shown in dotted lines in Fig. 2; when the screens are full and the air force or pressure is removed and the dust is no longer forced to impinge the walls of the screen, the screens collapse by the dust falling or being precipitated into a receptacle for holding the dust, from which it can be conveyed to any point. It will thus be seen that the screens are self cleaning or automatic in action and no agitation is necessary or any extraneous force is necessary for delivering the dust therefrom.

If any dust settles in between the series of screens any one of them can be slightly shifted as shown in Fig. 3, and the accumulated dust on the base or ledge at the bottom of the screen will be precipitated.

The screens operate like valves and open up and close together to normal repeatedly, under the operation of the apparatus, and need little, if any attention, as they are self operating.

I claim any modification of my invention which falls within the scope of this application.

What I claim as new and my invention and desire to secure by Letters Patent is:

1. In a dust arrester of the class described, a frame, an inverted flexible perforate sack-shaped screen having its closed end resiliently supported within the frame, abutments carried by the frame, and bars fixed to the lower open end of the screen and normally held in contact with the abutments by the supporting means.

2. A dust arrester as claimed in claim 1 in which the resilient supporting means includes a support element having its ends secured to the sides of the frame, and coiled springs having their upper ends secured to the supporting member and their lower ends connected to the closed end of the screen.

3. A dust arrester of the kind defined by claim 1 in which the resilient supporting means includes a support member having its ends connected to the frame, eye members carried by the support member, and coiled springs having their upper ends secured to the eye members and their lower ends connected to the closed end of the screen.

4. A dust arrester of the kind defined by claim 1 in which blocks are placed at each end of the screen and provided with downwardly and outwardly directed upper bevel surfaces.

5. A dust arrester of the kind defined by claim 1 in which the lower edge portions of the screen material are wound around said bars, and rods resting on the material of the screen for securing the lower edge portions of said material to said bars.

In testimony whereof, I affix my signature at Cincinnati, Ohio, this 13th day of March, 1920.

WILLIAM A. HEXT.